(12) United States Patent
Zhang

(10) Patent No.: US 8,935,449 B1
(45) Date of Patent: Jan. 13, 2015

(54) CUSTOMIZATION OF DATA PROCESSING EQUIPMENT WITH A REMOVABLE STORAGE DEVICE

(71) Applicant: EMC Corporation, Hopkinton, MA (US)

(72) Inventor: Hongzhen Zhang, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/715,575

(22) Filed: Dec. 14, 2012

(51) Int. Cl.
*G06F 3/00* (2006.01)
*G06F 5/00* (2006.01)
*G06F 3/06* (2006.01)
*G06F 13/10* (2006.01)
*G06F 11/30* (2006.01)

(52) U.S. Cl.
CPC .......... *G06F 3/0679* (2013.01); *G06F 11/3051* (2013.01); *G06F 13/10* (2013.01); *G06F 13/102* (2013.01)
USPC .................................. 710/104; 710/8; 710/16

(58) Field of Classification Search
CPC .... G06F 13/10; G06F 11/3051; G06F 13/102
See application file for complete search history.

(56) References Cited

U.S. PATENT DOCUMENTS

2010/0238486 A1* 9/2010 McFarland et al. .......... 358/1.15
2011/0091187 A1* 4/2011 Duffin et al. .................. 386/343

* cited by examiner

*Primary Examiner* — Zachary K Huson
(74) *Attorney, Agent, or Firm* — Proskauer Rose LLP

(57) ABSTRACT

The invention provides, in some aspects, methods and systems for customizing data processing equipment by storing, on a removable storage device, a predetermined data set of customer requirements. The removable storage device is coupled to a data processor executing a default data set of customer requirements. The data processor executes, from the removable storage device, the predetermined data set of customer requirements, thereby causing a non-disruptive customization of the data processor from the default data set of customer requirements to the predetermined data set of customer requirements. Removing the storage device from the data processor causes a non-disruptive customization of the data processor from the predetermined data set of customer requirements to the default data set of customer requirements.

17 Claims, 2 Drawing Sheets

CUSTOMIZATION OF DATA PROCESSING EQUIPMENT WITH A REMOVABLE STORAGE DEVICE

TECHNICAL FIELD

The present invention relates to customizing data processing equipment with localization data and Original Equipment Manufacturer (OEM) data stored on a removable storage device.

BACKGROUND

Data processing equipment such as servers or desktop computers are often manufactured and configured for a particular geographic region (e.g., North America) or a company (e.g., EMC). The configuration data can include, for example, specific language requirements and/or branding information. However, systems are often deployed in different regions and for different companies than originally intended. In order to deploy their existing systems in other regions or for other companies, manufacturers typically create a custom software package for that particular system. The manufacturing department then has to, at the very least, install that software package onto the equipment and reboot the system. Such installations and reboots are time and cost intensive.

SUMMARY

In one aspect of the invention, a method is provided for customizing data processing equipment by storing, on a removable storage device, a predetermined data set of customer requirements. The removable storage device is coupled to a data processor executing a default data set of customer requirements. The data processor executes, from the removable storage device, the predetermined data set of customer requirements, thereby causing a non-disruptive customization of the data processor from the default data set of customer requirements to the predetermined data set of customer requirements. Removing the storage device from the data processor causes a non-disruptive customization of the data processor from the predetermined data set of customer requirements to the default data set of customer requirements.

Related aspects of the invention provide causing non-disruptive customization of the data processor from the default data set of customer requirements to the predetermined data set of customer requirements without installing any data on the data processor.

Further related aspects of the invention provide executing the predetermined data set of customer requirements in response to the coupling of the removable storage device to the data processor.

Still further related aspects of the invention provide that the predetermined and default data sets of customer requirements comprise localization data. Further related aspects of the invention provide that the localization data corresponds to any of (i) geographic location, (ii) language, or (iii) time zone.

Still yet further related aspects of the invention provide that the predetermined and default data sets of customer requirements comprise Original Equipment Manufacturer (OEM) data. Further related aspects of the invention provide that the OEM data corresponds to any of one or more logos or text characters.

Further related aspects of the invention provide that the removable storage device comprises a Universal Serial Bus (USB) flash drive.

In other aspects of the invention, a method is provided for customizing data processing equipment by storing, on a removable storage device, a first set of localization and OEM rules. The removable storage device is coupled to a data processor executing a second set of localization and OEM rules. The data processor executes, from the removable storage device, the first set of localization and OEM rules, thereby causing a non-disruptive customization of the data processor from the second set of localization and OEM rules to the first set of localization and OEM rules. Removing the storage device from the data processor causes a non-disruptive customization of the data processor from the first set of localization and OEM rules to the second set of localization and OEM rules.

In other aspects of the invention, a system is provided for customizing data processing equipment including a data processor that executes a default data set of customer requirements. The system also includes a removable storage device coupled to the data processor, the removable storage device storing at least a predetermined data set of customer requirements; and a customization module that executes on the data processor, the customization module executing, from the removable storage device, the predetermined data set of customer requirements, thereby causing a non-disruptive customization of the data processor from the default data set of customer requirements to the predetermined data set of customer requirements.

Related aspects of the invention provide causing the non-disruptive customization of the data processor from the default data set of customer requirements to the predetermined data set of customer requirements without installing any data on the data processor.

Further related aspects of the invention provide executing the predetermined data set of customer requirements in response to the coupling of the removable storage device to the data processor.

Still further related aspects of the invention provide that the predetermined and default data sets of customer requirements comprise localization data. Further related aspects of the invention provide that the localization data corresponds to any of (i) geographic location, (ii) language, or (iii) time zone.

Still yet further related aspects of the invention provide that the predetermined and default data sets of customer requirements comprise Original Equipment Manufacturer (OEM) data. Further related aspects of the invention provide that the OEM data corresponds to any of one or more logos or text characters.

Further related aspects of the invention provide that the removable storage device comprises a Universal Serial Bus (USB) flash drive.

BRIEF DESCRIPTION OF THE DRAWINGS

A more complete understanding of the invention can be attained by reference to the drawings, in which.

DETAILED DESCRIPTION

System Architecture

Figure 1:
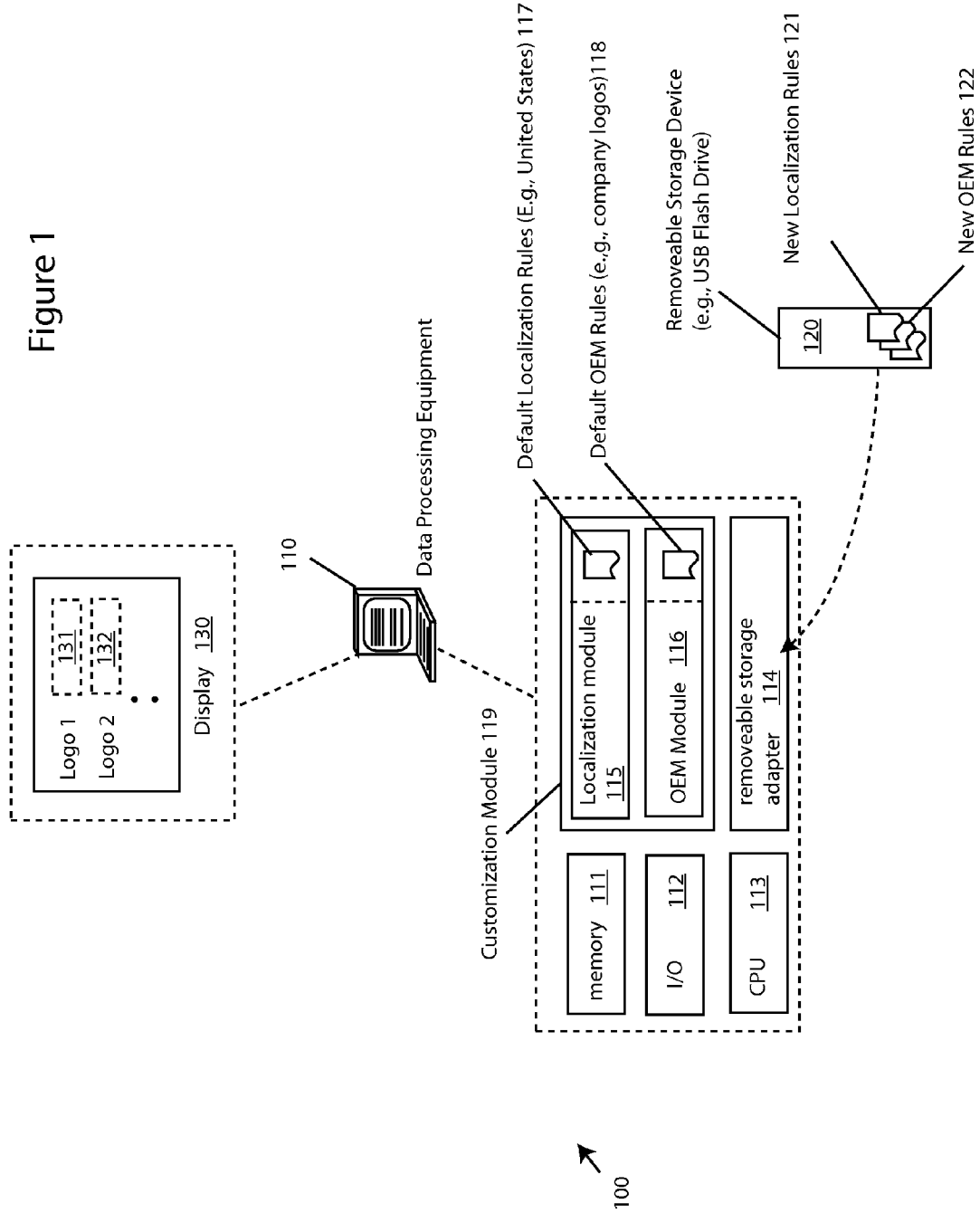
FIG. 1 depicts a system for customizing data processing equipment with localization data and/or OEM data stored on a removable storage device according to one implementation of the invention.

FIG. 1 depicts a system for customizing data processing equipment with localization data and/or OEM data stored on a removable storage device according to one implementation of the invention. More specifically, the system 100 includes a data processor 110 adapted for coupling with a removable storage device 120. The data processor 110 can execute a set of localization rules 121 and/or OEM rules 122 stored on the removable storage device 120 in order to customize the data processor 110, e.g., for a particular geographic region, company, etc. Storing and executing the rules 121, 122 on the removable storage device 120 is helpful, for example, because it allows for customization of the data processor 110 without having to install software onto the data processor 110.

In the illustrated embodiment, the data processor 110 can be a server computer, desktop computer, special-purpose computer, laptop computer, or other type of data processing equipment suitable for customization with a removable storage device. The illustrated data processor 110 includes a memory 111, I/O 112, CPU 113, removable storage adapter 114, localization module 115 and OEM module 116 (collectively, "Customization Module 119"), and display 130. Although functionality of the data processor 110 is achieved by components 110-116 in the illustrated embodiment, it will be appreciated that in other embodiments, the same functionality can be achieved with a greater or lesser number of such components, implemented in software and/or hardware. In other embodiments, for example, the functionality of the adapter 114 and modules 115, 116 may be found in a single component.

The removable storage adapter 114 facilitates coupling of the data storage device 120 with the data processor 110. In the illustrated embodiment, the adapter 114 comprises a Universal Serial Bus (USB) port disposed within an inner portion of the data processor 114, e.g., in order to reduce the likelihood that the storage device 120 is accidentally removed once it is coupled to the data processor 110. Although the adapter 114 implements a USB protocol and is disposed within an inner portion of the data processor 110 in the illustrated embodiment, in other embodiments the adapter 114 can implement different protocols (e.g., Firewire, Thunderbolt, etc.) and can be disposed elsewhere (e.g., an outer portion of the data processor 110 in a manner consistent with typical USB ports).

The illustrated adapter 114 further includes non-disruptive "plug and play" functionality for executing localization rules 121 and OEM rules 122. Thus, for example, the adapter 114 can trigger operation of localization module 115 and OEM module 116 when the storage device 120 is coupled to the data processor 110.

The localization module 115 executes a set of localization rules 117 or 121 defining an operation of the data processor 110 for a specific location (or set of locations). In the illustrated embodiment, the module 115 executes default localization rules 117 unless the removable storage device 120 is plugged in, at which point the module 115 executes localization rules 121 stored on the device 120, as discussed further below. In the illustrated embodiment, the module 115 executes the rules 121 without installing any software onto the data processor 110, or otherwise altering the software or hardware of the data processor 110.

The localization module 115 can implement a variety of methods for adapting the data processor 110 to the language(s) and/or other requirements defined by the localization rules 117, 121. For example, the module 115 can implement a set of location-specific software libraries that the data processor 110, and applications executing on the data processor 110, can access during operation. By way of further example, the module 115 can translate content on the data processor 110 into a different language, e.g., Chinese, Japanese, French, German, Spanish, etc.

The OEM module 116 executes a set of OEM rules 118 or 122 defining an appearance of the data processor 110 during operation (e.g., defining a company logo for display on the screen 130). In the illustrated embodiment, the module 116 executes default OEM rules 118 unless the removable storage device 120 is plugged in, at which point the module 116 executes OEM rules 122 stored on the device 120, as discussed further below. The module 116 executes the rules 122 without installing any software onto the data processor 110, or otherwise altering the software or hardware of the data processor 110.

The illustrated display 130 comprises a conventional monitor suitable for displaying text and graphics (e.g., an LCD monitor). During operation, the display 130 can typically render one or more logos 131, 132, and/or other identifying labels, indicating a particular brand or company associated with the data processor 110. For example, the display can render an EMC logo, or the logo of a third-party reseller, during system boot-up.

In the illustrated embodiment, the removable storage device 120 comprises a USB drive, although in other embodiments it can be another type of removable storage device suitable for coupling with the data processor 120 (e.g., a Thunderbolt drive, Firewire drive, hard disk drive, solid state drive, etc.). The device 120 stores a set of predetermined customer requirements for customizing the data processor 120. These requirements are embodied in the localization rules 121 and/or the OEM rules 122, although in other embodiments they can be embodied otherwise.

It will be appreciated that although only one data processor 110 and storage device 120 are shown and described here, in other embodiments there may be a greater number of such devices. For example, an array of data processors 110 can be customized by a single removable storage device 120, or a single data processor 110 can be customized by multiple removable storage devices 120, etc.

Localization Rules

The localization rules 117, 121 define an operation of the data processor 110. In the illustrated embodiment, the localization rules 117, 121 can define the language, date and time format, time zone information, character encoding format, and other attributes relevant to localization of the data processor 110. In the illustrated embodiment, the localization rules 117, 121 can be implemented as XML stylesheets, text files, or otherwise.

The default localization rules 117, more specifically, define a default operation of the data processor 110 that occurs when a removable storage device 120 is not coupled thereto. The localization rules 121 define a "new" operation of the data processor 110, e.g., as defined by a set of pre-determined customer requirements. For example, a customer in China may wish to resell hardware manufactured in the United States; the requirements for the Chinese language, etc., can be codified into the rules 121 and stored on the device 120.

OEM Rules

The OEM rules 118, 122 define an appearance of the data processor 110 during operation. In the illustrated embodiment, the OEM rules 118, 122 define one or more logos 131, 132, or other brand information (graphical, text, or otherwise) for rendering on display 130. For example, the default rules 118 may specify an EMC logo for display during system boot-up, while the "new" OEM rules 122 may specify a logo of a third-party reseller during boot-up. In the illustrated embodiment, the OEM rules 118, 122 can be implemented as XML stylesheets, text files, or otherwise. The logos 131, 132, or other OEM data, can be stored in the rules 118, 122 themselves, or in separate files.

The default OEM rules 118, more specifically, define a default appearance of the data processor 110 that occurs when a removable storage device 120 is not coupled thereto. The OEM rules 122 define a "new" appearance of the data processor 110 during operation, e.g., as defined by a set of pre-determined customer requirements. For example, a third-party hardware reseller may wish to display their company logo, or other branding information, during system boot-up; the requirements for displaying the reseller's logo, etc., can be codified into the rules 122 and stored on the device 120.

Operation

Figure 2:
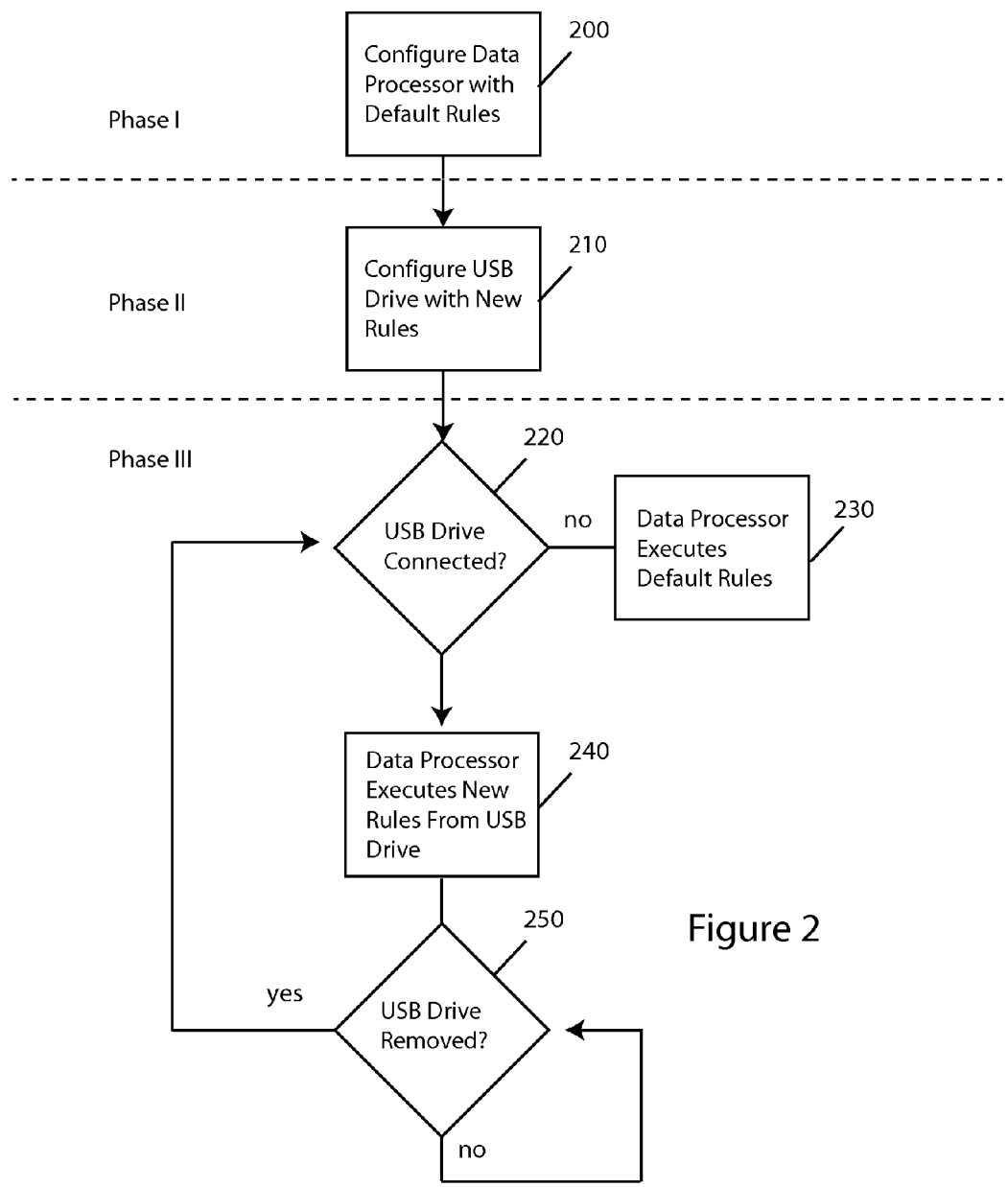
FIG. 2 depicts a configuration and operation of a system for customizing data processing equipment with localization data and/or OEM data stored on a removable storage device according to one implementation of the invention.

FIG. 2 is a flow diagram depicting an exemplary configuration and operation of a system for customizing data processing equipment with localization data and/or OEM data stored on a removable storage device according to one implementation of the invention.

In step 200, the data processor 110 is configured with a set of default localization rules 117 and default OEM rules 118. The default rules 117, 118 are typically configured during manufacture of data processor 110, although they can be figured during a later phase, as well. In the illustrated embodiment, the rules 117, 118 can be manually programmed into the data processor 110 by a user, e.g., a computer programmer, or they can be automatically generated, e.g., based upon a manufacturing location of the data processor 110.

In step 210, the removable storage device 120 is configured with a new set of localization rules 121 and OEM rules 122 based upon a set of pre-determined customer requirements. For example, the localization rules can include data relating to language, time zone, keyboard instructions, and/or other data relating to geographic region. Similarly, the OEM rules can include data relating a customer's branding information, e.g., logos, graphics, text, etc., for display by the data processor 110 during operation, e.g., on display 130. Like the default rules 117, 118, the new rules 121, 122 can be manually entered, e.g., by a computer programmer, or they may be automatically generated, e.g., based upon a set of requirements submitted by a customer.

In step 220, the data processor 110 determines, via the adapter 114, if a valid removable storage device containing new localization 121 and/or OEM 122 rules is coupled to the system 110, e.g., via adapter 114. If no device 120 is coupled to the data processor 110, or if the device 120 contains invalid rules 121, 122, the data processor 110 executes the default rules 117, 118, as shown in step 230. If a valid device 120 is coupled to the data processor 110, the data processor executes the new rules 121, 122 instead of the default rules 117, 118, as shown in step 240.

More specifically, in step 240, the data processor 110 is non-disruptively customized by executing, via the modules 115, 116, the new rules 121, 122 directly from the removable storage device 120 without installing any software onto the data processor 110. In the illustrated embodiment, no reboot of the data processor 110 is required for the data processor 110 to execute the new rules 121, 122. Moreover, the rules 121, 122 are executed by the data processor 110 in a "plug and play" manner, i.e., without requiring any user input.

In step 250, the data processor 110 determines, via adapter 114, if the removable storage device 120 has been removed. If the device 120 remains connected to the data processor 110, the processor 110 continues to execute according to the new rules 121, 122, as shown in steps 220 and 240. If the removable storage device 120 is removed, or otherwise disconnected, from the data processor 110, the processor 110 non-disruptively reverts back to executing the default rules 117, 118, via modules 115, 116. Since execution of the new rules 121, 122 did not require any installation on the data processor 110, reversion back to the default rules 117, 118 does not require any software removal or other configuration. In the illustrated embodiment, no reboot of the data processor 110 is required to switch from the new rules 121, 122 back to the default rules 117, 118. Moreover, because of the "plug and play" functionality described above, user input is not required.

Although the default rules 117, 118 and new rules 121, 122 are discussed above with respect to localization and OEM data and requirements, it will be appreciated that in other embodiments, the rules may include other requirements and data instead of or in addition to the rules 117, 118, 121, 122.

Hardware and Software Considerations

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for longterm data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Bluray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the technology can be embodied in other specific forms without departing from the spirit or essential characteristics thereof. The foregoing embodiments are therefore to be considered in all respects illustrative rather than limiting of the technology described herein. Scope of the technology is thus indicated by the appended claims, rather than by the foregoing description, and all changes that come within the meaning and range of equivalency of the claims are therefore intended to be embraced therein.

It will be appreciated that the illustrated embodiment and those otherwise discussed herein are merely examples of the technology and that other embodiments, incorporating changes thereto, fall within the scope of the technology.

In view of the foregoing, what I claim is:

1. A method of customizing data processing equipment comprising:
   A) storing, on a removable storage device, a predetermined data set of customer requirements;
   B) coupling the removable storage device to a data processor executing a default data set of customer requirements;
   C) executing, from the removable storage device, the predetermined data set of customer requirements, thereby causing a non-disruptive customization of the data processor from the default data set of customer requirements to the predetermined data set of customer requirements without installing software on the data processor; and
   D) decoupling the storage device from the data processor, thereby causing a non-disruptive customization of the data processor from the predetermined data set of customer requirements to the default data set of customer requirements.

2. The method of claim 1, further comprising causing the non-disruptive customization of the data processor from the default data set of customer requirements to the predetermined data set of customer requirements without installing any data on the data processor.

3. The method of claim 1, further comprising executing the predetermined data set of customer requirements in response to the coupling of the removable storage device to the data processor.

4. The method of claim 1, wherein the predetermined and default data sets of customer requirements comprise localization data.

5. The method of claim 4, wherein the localization data corresponds to any of (i) geographic location, (ii) language, or (iii) time zone.

6. The method of claim 1, wherein the predetermined and default data sets of customer requirements comprise Original Equipment Manufacturer (OEM) data.

7. The method of claim 6, wherein the OEM data corresponds to any of one or more logos or text characters.

8. The method of claim 1, wherein the removable storage device comprises a Universal Serial Bus (USB) flash drive.

9. A method of customizing data processing equipment comprising:
   A) storing, on a removable storage device, a first set of localization and OEM rules;

B) coupling the removable storage device to a data processor executing a second set of localization and OEM rules;

C) executing, from the removable storage device, the first set of localization and OEM rules, thereby causing a non-disruptive customization of the data processor from the second set of localization and OEM rules to the first set of localization and OEM rules without installing software on the data processor; and D) decoupling the storage device from the data processor, thereby causing a non-disruptive customization of the data processor from the first set of localization and OEM rules to the second set of localization and OEM rules.

10. A system for customizing data processing equipment comprising:

A) a data processor that executes a default data set of customer requirements;

B) a removable storage device coupled to the data processor, the removable storage device storing at least a predetermined data set of customer requirements; and C) a customization module that executes on the data processor, the customization module executing, from the removable storage device, the predetermined data set of customer requirements, thereby causing a non-disruptive customization of the data processor from the default data set of customer requirements to the predetermined data set of customer requirements without installing software on the data processor.

11. The system of claim 10, further comprising causing the non-disruptive customization of the data processor from the default data set of customer requirements to the predetermined data set of customer requirements without installing any data on the data processor.

12. The system of claim 10, further comprising executing the predetermined data set of customer requirements in response to the coupling of the removable storage device to the data processor.

13. The system of claim 10, wherein the predetermined and default data sets of customer requirements comprise localization data.

14. The system of claim 13, wherein the localization data corresponds to any of (i) geographic location, (ii) language, or (iii) time zone.

15. The system of claim 10, wherein the predetermined and default data sets of customer requirements comprise Original Equipment Manufacturer (OEM) data.

16. The system of claim 15, wherein the OEM data corresponds to any of one or more logos or text characters.

17. The system of claim 10, wherein the removable storage device comprises a Universal Serial Bus (USB) flash drive.

* * * * *